(12) United States Patent
Nederlof

(10) Patent No.: US 6,320,844 B1
(45) Date of Patent: Nov. 20, 2001

(54) DISTRIBUTED RESTORATION

(75) Inventor: Leo Nederlof, Berchem (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/129,940

(22) Filed: Aug. 6, 1998

(30) Foreign Application Priority Data

Aug. 25, 1997 (EP) .................................................. 97401984

(51) Int. Cl.[7] .............................. H04J 3/14; H04L 12/28; G01R 31/28
(52) U.S. Cl. ......................... 370/216; 370/248; 370/254; 714/2
(58) Field of Search ..................................... 370/218, 216, 370/248, 242, 245, 225, 400, 217, 221, 396, 398, 360, 422, 219, 220, 453, 254; 714/2, 4, 25, 43, 47; 709/242, 243, 244

(56) References Cited

U.S. PATENT DOCUMENTS

| | | | |
|---|---|---|---|
| 5,173,689 | * 12/1992 | Kusano | 340/827 |
| 5,386,544 | * 1/1995 | Nakamura | 395/575 |
| 5,463,615 | * 10/1995 | Steinhorn | 370/16 |
| 5,590,118 | 12/1996 | Nederlof . | |
| 5,636,203 | * 6/1997 | Shah | 370/244 |

FOREIGN PATENT DOCUMENTS 0699006  2/1996 (EP) .

OTHER PUBLICATIONS

"Ring–based bandwidth dimensioning in SDH networks" H.L. Owen Computer Communications, vol. 19, No. 2, Feb. 1996, pp. 102–112.

"CCIT Standardisation of Telecommunications Management Networks" by W. Widl, Ericsson Review, vol. 68, No. 2, Jan. 1, 1991, pp. 34–51.

"End–to–End Survivable Broadband Networks" by L. Nederlof, IEEE Communications Mag., vol. 33, No. 9, Sep. 1, 1995, pp. 63–70.

"Multi–Ring Approach for ATM–VP Networks Survivability" M.M. Slominski, et al, Proceedings of the International.

"Double Search Self–Healing Algorithm and Its Characteristics" by H. Fuji et al, Electronics and Communications in Japan, Part 1, vol. 77, No. 3, 1994, pp. 75–86.

ITU–T Recommendation M3010 "Principles for a Telecommuncations Management Network", 05/96 paragraph 2.3, pp. 9–11.

* cited by examiner

*Primary Examiner*—Alpus H. Hsu
*Assistant Examiner*—Duc Ho

(57) ABSTRACT

The present invention provides a method and system in a telecommunications network for restoring network element failures or network link failures in case not all network elements possess distributed restoration capabilities, for example during an introduction-phase of the distributed restoration system, or in case a network consists of different kinds of network elements provided by different providers, i.e. a multivendor network. The distributed restoration of network elements which do not possess these capabilities is taken over by the distributed restoration module of network management. The interface which is used for communication between a network element and the network management, is preferably implemented according to the $q_3$ standard. The distributed restoration module within the network management can be replaced by a central restoration module which has the advantage over the distributed module that a better solution will be found.

8 Claims, 1 Drawing Sheet

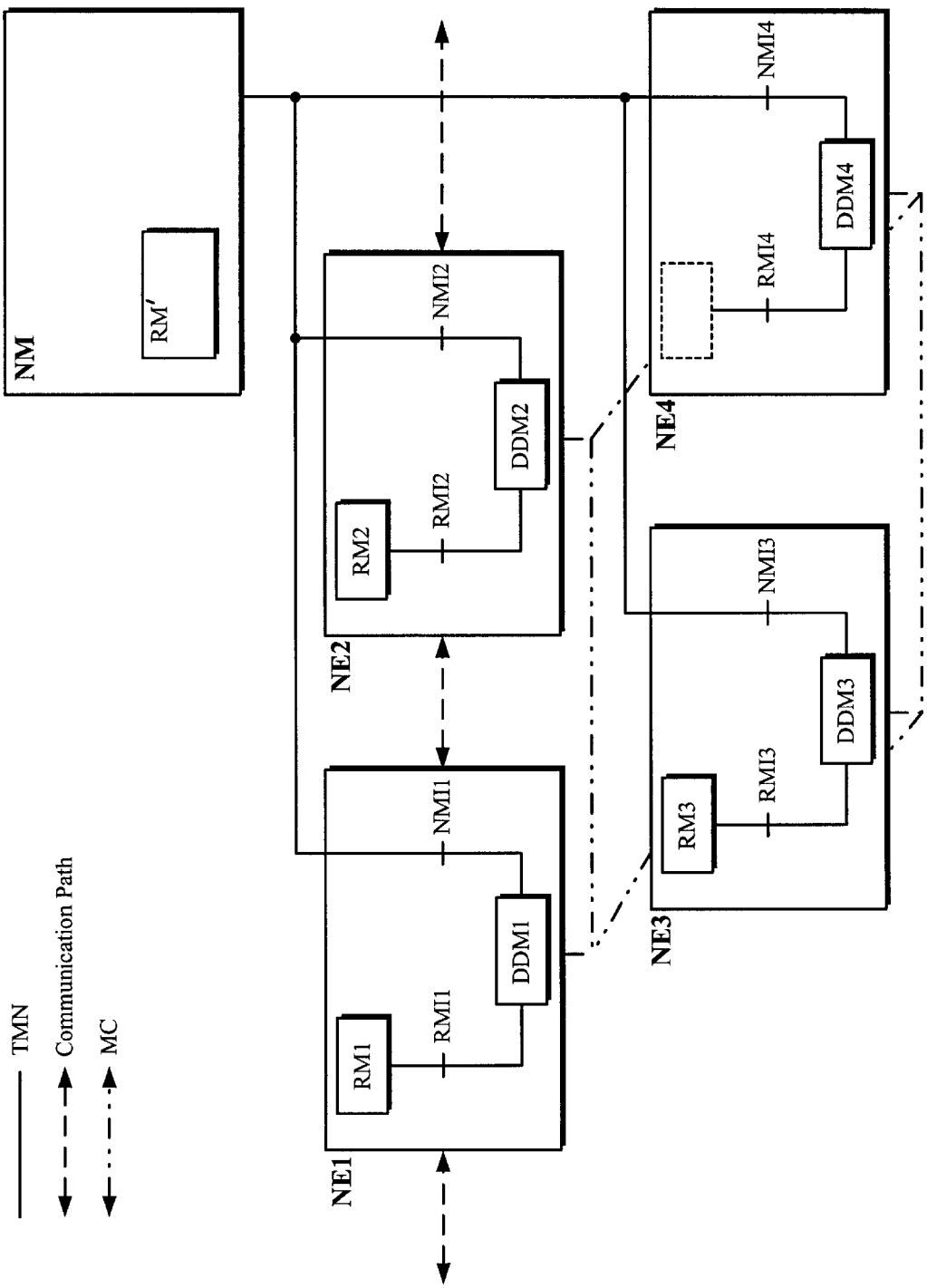

DISTRIBUTED RESTORATION

BACKGROUND OF THE INVENTION

1. Technical Field

The present invention relates to a distributed restoration method for link- or node-failure within a communication network, and a related system.

2. Discussion of Related Art

Such a distributed restoration method and related system are already known in the art, e.g. from the article "Double Search Self-Healing Algorithm and its Characteristics " from the authors H. Fujii and N. Yoshikai from NTT Telecommunications Network Laboratories. This article is published in *"Electronics and Communications in Japan"*, Part 1, Volume 77, No. 3, 1994, Page 75–86. The article is translated from *Denahi Joho Taushin Gakkai Ronbunschi*, Vol. 76-B-1, No. 7, July 1993, pp.485–495.

Therein, a communication network is described consisting of a plurality of Network Elements, called nodes, interconnected by Network links, called links. Along these Network links a communication-path, or a path in the article, is set up between each couple of communicating nodes. If a failure occurs, on such a communication path, a system for distributed restoration will recover this communication-path.

During introduction of a distributed restoration system in an entire communications-network comprising a number of Network Elements, no distributed restoration for the complete communications-network can be provided because the introduction of such a distributed restoration system will in general not take place at once but only in a gradual way, Network Element by Network Element. Moreover in communication-networks that are built up of different kinds of Network Elements, e.g. in multivendor or multi-operator environments, distributed restoration may not be supported throughout the entire network since the different Elements may not be compatible.

SUMMARY OF THE INVENTION

An object of the present invention is to provide a method and a system for restoration of the above known type but wherein capabilities for restoration at any time, i.e. even during the introduction-phase of the distributed restoration system, are available throughout the entire network, even if this network comprises different kinds of Elements (multivendor network).

According to a first aspect of the invention, a method for distributed restoration of a communication-path in a communications network comprising a plurality of Network Elements and a Network Management module, all interconnected, said method being used in case of Network Link or Network Element failure along said communication-path, is characterized in that said method comprises the steps of:
- a. determination of a degree of availability of distributed link or node failure restoration capabilities within said communications network by a Network Element among said Network Elements involved in said restoration; and either one of the following steps:
  - b1. deciding to restore said failure by means of a distributed restoration system if said degree exceeds a predefined level; or
  - b2. deciding to restore said failure in co-operation with a restoration system within the Network Management module if said degree does not exceed said predefined level.

According to a second aspect of the invention, a system used for restoration of a communication path in a communications network comprising a plurality of Network Elements and a Network Management module, all interconnected, said system being used in case of Network Element failure or Network Link failure along said communication path, is characterized in that said system comprises:
- a. a plurality of determination- and decision-means, each one of which is included in a respective one of said plurality of Network Elements, and is adapted to determine a degree of availability of distributed link or node failure restoration capabilities within said communications network and to decide to restore said failure in a distributed way if said degree exceeds a predefined level or to restore said failure in co-operation with said Network Management if said degree does not exceed said predefined level,
- b1. a plurality of first restoration means, each one of which is comprised in a respective one of said Network Elements and is coupled to a respective one of said plurality of determination- and decision-means, and is adapted to restore said failure under control of said respective determination- and decision-means, coupled to each one of said determination- and decision-means, and adapted to restore said failure under control of said respective determination- and decision-means.

According to a third aspect of the invention, a Network Element is characterized according to a second aspect of the invention.

Indeed, by determination of the degree of availability of distributed link or node restoration facilities within the network, for instance a Boolean variable: i.e. a Network Element does possess said distributed restoration facilities or does not possess said distributed restoration facilities, data appropriate for decision-making is derived. Considering these data, a decision can be made whether restoration in co-operation with the restoration module RM' within the Network Management module NM should be applied, instead of restoration applied by the involved Network Elements. In this co-operation, the occurring link or Network errors can be restored also in case insufficient Network Elements do possess distributed restoration facilities, because this restoration module RM' within Network Management is not sensitive thereto. This is for example valid during introduction of distributed restoration facilities in a Telecommunications Network or in a multivendor network.

Indeed, the mentioned degree of availability can be determined in a number of different ways: for instance, by determining if a Network Element does possess said distributed restoration facilities or does not possess said distributed restoration facilities, or for example by calculating the percentage of neighboring Network Elements possessing distributed restoration facilities. These are preferable degrees of availability because of their simplicity.

An additional feature of the present system is that the second restoration module, according to the second aspect of the invention, is adapted to implement distributed restoration facilities.

The restoration module in the Network Management NM possesses the same distributed facilities as the restoration modules in the Network Elements. For each Network Element that does not possess a restoration module, an instance of the distributed restoration module is provided in this Network Management. This instance of the restoration module handles the failure instead of the restoration module within the Network Element. In this way, it is possible to support distributed restoration in the entire network, even in case a number of Network elements do not possess distributed restoration facilities.

Another feature of the present invention is the case wherein the restoration module in the Network management possesses central restoration facilities. In that case, this central restoration mechanism is activated if restoration is necessary and not all Network Elements do possess distributed restoration facilities. The advantage of the central restoration method, over the distributed restoration method, is the use of centrally available network information that facilitates finding an optimum solution, instead of finding a proper solution concerning the restoration of a communications path.

An additional characteristic feature of the present system is that the Network Management Module communicates with said Network Elements via a corresponding Network Management Interface which is implemented according to the $q_3$ standard, as defined in ITU-T Recommendation M. 3010.

The $q_3$-interface, as defined in *ITU-T Recommendation M3010 "Principles for a Telecommunications Management Network"*, 05/96 paragraph 2.3, is used together with an existing co-ordinating Telecommunications Management Network TMN to support the co-operation of distributed restoration with the restoration module in the Network Management module NM. An advantage of usage of the $q_3$ interface together with the Telecommunications Management Network is reduction of complexity because already existing elements are used. In this way, no additional new elements are required to support the co-operation between the restoration module within the Network management module NM and the distributed restoration module.

The present invention also relates to a Network Element and a Network Management module implementing the above method and included in the above system.

BRIEF DESCRIPTION OF THE DRAWING

The above and other objects and features of the invention will become more apparent and the invention itself will be best understood by referring to the following description of an embodiment taken in conjunction with the sole FIGURE of the accompanying drawing that represents a Telecommunications Network wherein a method according to the present invention is applied.

DETAILED DESCRIPTION OF THE PREFERRED EMBODIMENTS

The network drawn in the FIGURE comprises a plurality of Network Elements NE1, NE2, NE3 and NE4 interconnected by a plurality of Network links. Along these Network links and Network Elements NE1, NE2, NE3 and NE4 a communication path is set-up.

In the following paragraphs, referring to the drawing, a network will be described wherein an implementation of the method according to the present invention is executed. In the first paragraph the elements of the network in the figure are described, in the second paragraph, the interconnections between all before described Network elements are defined and in a later paragraph the actual execution of the restoration of node- or link-failure will be described.

The important elements of the present communications Network are the Network Elements NE1, NE2, NE3 and NE4 whose main task is providing the switching function within the network. Within the network, there are two different kinds of Network Elements NE1, NE2, NE3 and NE4 available, the first kind of Network Element, nodes NE1, NE2 and NE3 supporting distributed restoration of node or link-failure and the second kind of nodes, node NE4, which do not possess these distributed restoration facilities. The latter named kind of Network node NE4 might be from a different supplier or a Network node which is not yet updated with respect to the distributed restoration facilities. Assume one of both reasons, or even another one, is valid for not having distributed restoration facilities. The Network nodes of the first kind, nodes NE1, NE2 and NE3 do have restoration facilities by means of the respective distributed restoration modules RM1, RM2 and RM3 included therein, the other kind of nodes have no restoration module included. A Network Management module NM which is part of the network keeps the overview of the network and takes care of central control. A modular component of this Network Management module NM is a restoration module RM' included therein and possessing distributed restoration facilities. All Network Elements NE1, NE2, NE3 and NE4 are equipped with the respective Network Management Interfaces NMI1, NMI2, NMI3 and NMI4 to the Network Management module NM. In this network these Network Management Interfaces, are implemented according to the standardized $q_3$ interface. So this $q_3$, interface is performing as an interface between the Network Management Module NM and each of Network Element NE1, NE2, NE3 and NE4.

Besides this interface, all Network Elements NE1, NE2, NE3, and NE4 are equipped with one of the respective Restoration Module Interfaces RMI1, RMI2, RMI3 and RMI4 which take care of the interface between the corresponding Restoration Module RM1, RM2 and RM3 and a Messaging Channel MC. The Messaging Channel is constituted by the connections between all Network Elements which handle all messages sent from one Network Element to another Network Element.

Another important element of each Network Element is the corresponding Determination and Decision module DDM1, DDM2, DDM3 or DDM4 which determines if the respective Restoration Module is present within each of the Network Elements and depending on the previous result decides whether the respective Network Element NEl, NE2, NE3, NE4 performs the restoration or the Distributed Restoration Module RM' within the Network Management NM performs the network restoration.

Each of Network Element is interconnected with the other adjacent Network Elements by the Network. Besides these interconnections, each of following Network Elements NE1, NE2, NE3 and NE4 are connected to the Network Management Module NM via the Telecommunications Management Network TMN. The entire interconnection scheme can be derived from the FIGURE.

Each Restoration Module within a Network Element is able to communicate with each of the other Restoration Modules within the Network Elements via a Messaging Channel connected in the same way or in a way similar to that shown in the FIGURE.

In order to explain the working of the present invention it is supposed that a communication path is set-up along a number of links. For example the path is set up via an incoming link at Network Element NE1, a link between Element NE1 and Element NE2 to Element NE2 and via an outgoing link from Network Element NE2. This communications path is shown in the figure by a dashed line with double arrows. Suppose a Network Link Failure occurs at the link between Network Element NE1 and Network Element NE2. In that case an alternative route for the failing part of the communications-path needs to be determined. It has to be noted that the principle of handling in the situation as explained hereafter is similar in case of a Network Element failure.

Another assumption concerns the degree of availability. The degree of availability is, in this embodiment, a Boolean variable, that means a network Element does possess said distributed restoration facilities or does not possess said distributed restoration facilities.

It has to be noted that also other ways of determining the degree of availability can be used, e.g. the percentage of neighboring Network Elements possessing distributed restoration facilities.

It is assumed that any person skilled in the art is up to date concerning basic principles of network restoration. Therefore the steps of the network restoration are not described in detail.

Network Element NE1, that is an adjacent Element to the link error, initiates the restoration by sending a restoration message to all adjacent Elements via the Messaging Channel MC (Not all adjacent nodes are included in this picture for sake of clarity of the picture). This message is sent to Network Element NE3 as well. The logical Determination- and Decision Module DDM3 of Network Element NE3 receives the message, determines if a Restoration Module is available or not and subsequently decides if the message will be handed over to the restoration module RM3 in the Network Element or to the restoration module RM' within Network management. Because RM3 is available in the Network Element NE3, the message is handed over thereto. The restoration Module RM3 on its turn initiates sending of restoration messages to neighboring Elements of Network Element NE3. In this way, Network Element NE4 is reached by a restoration message sent by Network Element NE3. NE4's logical Determination and Decision module DDM4 then determines no Restoration module is available within Network element NE4 and subsequently decides to throughput the received restoration message via its C3 Network Management Interface and Telecommunications Management Network TMN to the Restoration Module RM' within Network Management. NM The message received here is handled by RM' according to the same algorithm as it would be treated in a Restoration Module like RM1–RM3. So RM' takes care of the path set-up part instead of the restoration Module of Network Element NE4 and sends the message to Network Element NE2. Then an alternative path is found, and a confirmation message is sent to Network element NE1 to indicate the communication path can be restored via the respective Network Elements NE1, NE3, NE4 and NE2.

To extend the earlier described functionality it is possible to replace the mentioned algorithm within restoration module RM' within the Network Management module by a centralized algorithm. The principle of functioning is mainly the same as the before described restoration link restoration. However, because a central restoration module has all central information concerning the network and the state thereof at its disposal, it is possible to implement the restoration and find a better solution than the implementation of restoration with a distributed restoration module.

The earlier described communications network is provided with means wherein the restoration system, that is the distributed restoration system in the Network Elements as well as the restoration module within the Network Management, can be provided in a modular way. Therefore a framework consisting of the aforementioned Network Management Interface and Restoration Module Interface is constituted.

The advantage of provision of the restoration system, in the modular way, is that the operator can choose which kind of algorithm is the most suitable one.

While the principles of the invention have been described above in connection with specific apparatus, it is to be clearly understood that this description is made only by way of example and not as a limitation on the scope of the invention, as defined in the appended claims.

What is claimed is:

1. Method for distributed restoration of a communication path in a communications network comprising a plurality of Network Elements (NE1, NE2, NE3 and NE4) and a Network Management Module (NM), all interconnected by network links, said method being used in case of failure along said communication path, comprising the steps of:

determining, using at least one of said Network Elements, a degree of availability of distributed restoration capabilities within said communications network; and deciding to recover from said failure by means of a distributed restoration system if said degree of availability exceeds a predefined level; or deciding to recover from said failure in co-operation with a restoration system within the Network Management Module (NM) if said degree of availability does not exceed said predefined level.

2. Method for distributed restoration according to claim 1, characterised in that said degree of availability of distributed restoration capabilities is defined as a Boolean variable, indicating whether or not a network Element possesses said distributed restoration capability.

3. Method according to claim 1, further comprising performing said determining and deciding steps in a determination-and-decision-means (DDM1–DD4) forming part of one of said Network Elements (NE) and communicating a result of said determining and deciding steps to other ones of said Network Elements via a Messaging Channel interconnecting said Network Elements.

4. A distributed restoration system used for restoration of a communication path in a communications network comprising a plurality of Network Elements (NE1, NE2, NE3 and NE4) and a Network Management Module (NM), all interconnected by links, said system being used in case of failure along said communication path, comprising:

a. a plurality of determination- and decision-means (DDM1–DDM4), each one of which is included in a respective one of said plurality of Network Elements and is adapted to determine a degree of availability of distributed restoration capabilities within said communications network and to decide, selectively, to recover from said failure in a distributed way if said degree of availability exceeds a predefined level or to recover from said failure in co-operation with said Network Management Module (NM) if said degree of availability does not exceed said predefined level, b1. a plurality of first restoration means (RM1–RM3), each one of which is comprised in a respective one of said Network Elements and is coupled to a respective one of said plurality of determination- and decision-means (DDM1–DDM3) and is adapted to recover from said failure under control of said respective determination- and decision-means, b2. a second restoration means (RM') in said Network Management Module (NM) and coupled to each one of said determination- and decision-means (DDM1–DDM4), and adapted to recover from said failure under control of said respective determination- and decision-means.

5. A distributed restoration system according to claim 4, wherein
said second restoration module (RM') is adapted to provide distributed restoration facilities.

6. A distributed restoration system according to claim 3, wherein
said second restoration module (RM') is adapted to provide central restoration facilities.

7. A distributed restoration system according to claim 4, characterised in that said Network Management module (NM) communicates with said Network Elements (NE1–NE4) via a corresponding Network Management Interface (NMI1–NMI4) which is implemented according to the $q_3$ standard, as defined in ITU-T Recommendation M.3010.

8. A Network Element as specified in claim 4.

* * * * *

UNITED STATES PATENT AND TRADEMARK OFFICE
CERTIFICATE OF CORRECTION

PATENT NO. : 6,320,844 B1
DATED : November 20, 2001
INVENTOR(S) : Leo Nederlof

It is certified that error appears in the above-identified patent and that said Letters Patent is hereby corrected as shown below:

<u>Column 7,</u>
Line 7, delete "3," and substitute -- 4, -- therefor.

Signed and Sealed this

Fourteenth Day of May, 2002

Attest:

JAMES E. ROGAN
Attesting Officer
Director of the United States Patent and Trademark Office